Nov. 20, 1962  R. B. BUTTERS  3,064,357
CONVEYOR SPEED CONTROL BY MEASURING MATERIAL LEVEL
Filed Sept. 2, 1959
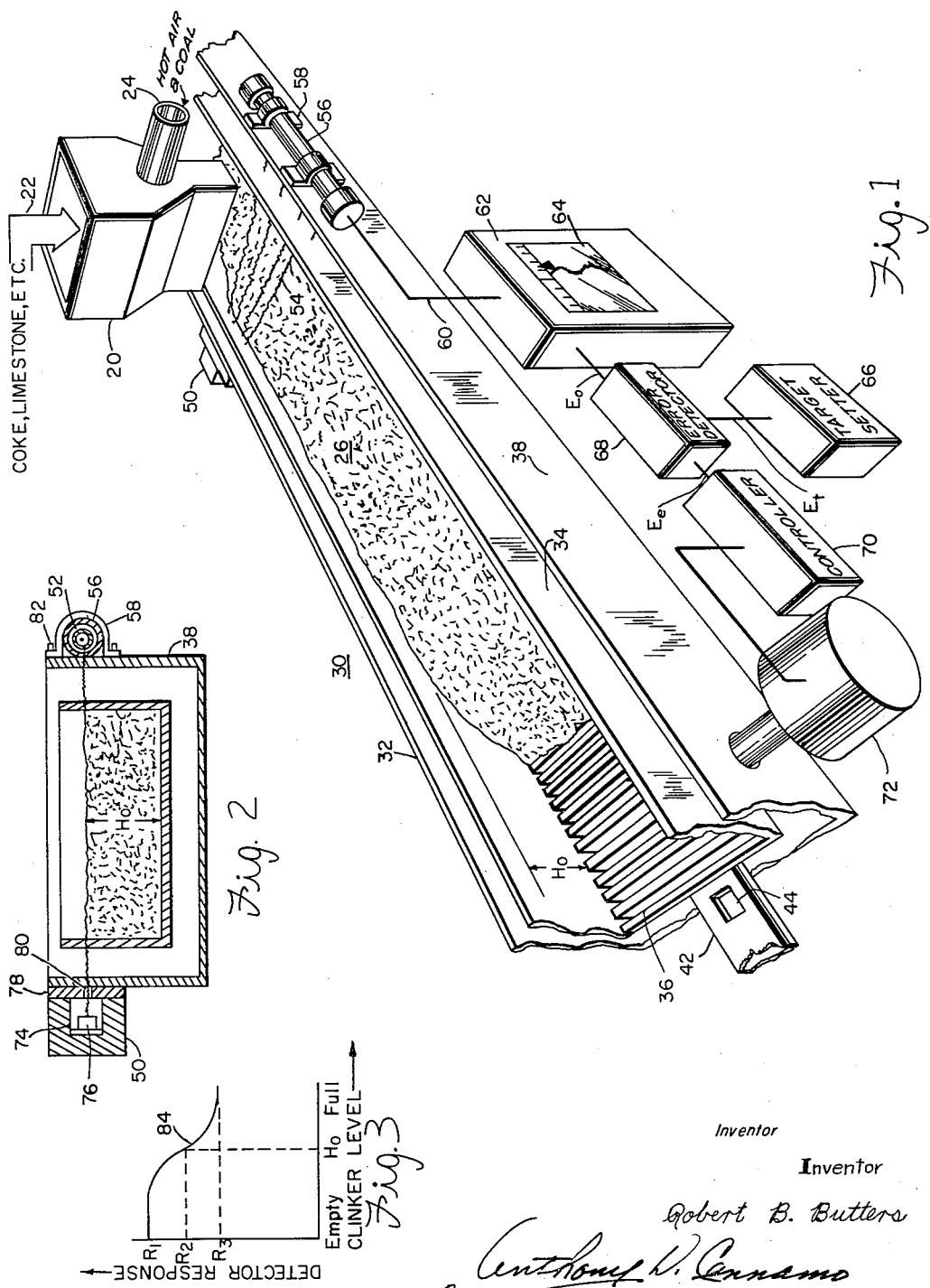
Inventor
Robert B. Butters
By Anthony V. Cannamo United States Patent Office 3,064,357
Patented Nov. 20, 1962

3,064,357
CONVEYOR SPEED CONTROL BY MEASURING
MATERIAL LEVEL
Robert B. Butters, Columbus, Ohio, assignor to Industrial
Nucleonics Corporation, a corporation of Ohio
Filed Sept. 2, 1959, Ser. No. 837,651
3 Claims. (Cl. 34—52)

This invention relates to material handling systems and more particularly to a novel method and means for controlling the level of heated material deposited on a cooler conveyor.

Conveyors of every type are being used in industry to expedite the handling of various materials. Roller, belt, bucket and cooler conveyors are representative of a few types in widespread useage. Each industrial process experiences problems in controlling these conveyors to derive the utmost in efficiency from their use. For example, in a typical process for manufacturing powdered cement, coke, limestone and other materials are fired in a rotary kiln to form clinkers which are delivered from the kiln by a vibrating cooler conveyor to a ball mill for grinding. While carried by the conveyor, the hot clinkers are cooled by air currents forced upward through the grating base portion into the clinker bed. Due to various factors such as a variable rate of clinker flow from the kiln, the distribution of clinkers on the conveyor has not been uniform. Quite often there is a trend toward an excessive accumulation of clinkers. Since the rate of clinker cooling is much slower when this occurs, the conveyor grating eventually burns out and the process must be shut down while the defective grating is replaced. It has been determined that there is an optimum height of the clinker bed which, when maintained by the process prevents grating burnout and at the same time provides an ample rate of flow of clinkers of a desired temperature.

The present invention provides novel method and means for measuring the level of the clinker bed and controlling the speed of a cooler conveyor in accordance with said measurements to continuously maintain the height of the clinker bed at the desired value. In accordance therewith, a radiation source and detector are mounted at opposite sides of the conveyor so that the clinkers pass therebetween. The detector generates a signal indicative of the amount of radiation traversing the conveyor which is a function of the height of the clinker bed. Another signal indicative of the desired or target level is generated and compared with the radiation detector output. Any difference in the two signals comprises an error signal which is coupled to a controller for adjusting the speed of the cooler-conveyor. If a buildup of clinkers is detected, conveyor speed is increased to more sparsely distribute the clinkers. Conversely, an error in the opposite direction actuates the controller to decrease the speed of the cooler conveyor.

Accordingly, it is a primary object of the present invention to provide method and means for automatically controlling the level of heated material deposited on a cooler conveyor.

It is another object of the present invention to provide a system for continuously measuring and controlling the level of heated material on a cooler conveyor to produce a more uniform distribution of the material than heretofore possible with devices of a similar nature.

It is yet another object of the present invention to provide a measuring and controlling system for a cooler conveyor which allows more uniform cooling of heated material deposited thereon and effectively eliminates destructive burning of the grating.

The foregoing objects as well as additional advantages and features of the present invention will become more apparent from the following description taken in conjunction with the drawings, in which:

FIG. 1 is a perspective view partly diagrammatic of a section of a cement process utilizing the measuring and controlling system of the present invention;

FIG. 2, is a transverse section of the conveyor of FIG. 1 showing the level sensing apparatus; and FIG. 3 is a graph illustrating the response of the level sensing apparatus.

With reference to the drawings and specifically to FIG. 1, there is diagrammatically shown a rotary kiln 20 such as used in a cement process. Coke, limestone and other ingredients are introduced at 22 and fired by a hot air and powdered coal mixture admitted at 24. After traveling through the kiln 20, the raw materials exit as hot clinkers 26 and fall upon a cooler conveyor 30. The clinkers 26 are transported in the direction indicated toward a series of ball or rod mills where the cooled clinkers are pulverized to form powdered cement.

Generally, the conveyor 30 is of the vibrating type with side walls 32 and 34 joined by a grating base portion 36. A separate stationary casing 38 adjoins the vibrating portions 32—36 and extends for the longitudinal dimension thereof. To cool the hot clinkers 26, air is forced through a duct 42 running the length of the conveyor 30 and having a plurality of openings 44. Cooling air blown upwardly through the openings 44 passes through the clinkers 26 removing heat therefrom in the interim.

Frequently, an increase in the rate of clinker flow from the kiln 20 causes an excess accumulation of clinkers 26 upon the conveyor 30. The clinkers pile up to such an extent that the air currents cannot adequately cool the material during transit. The heat retained in the clinker bed 26 eventually destroys the grating 36. The present invention proposes a scheme whereby the height of the clinker bed 26 is measured and the speed of conveyor 30 is regulated in accordance with the measurements to provide a more even distribution of clinkers 26.

To measure the height of the clinker bed 26, the present invention provides a nuclear radiation gauge including a housing 50 for a source of radiation and a housing 56 for a radiation detector 52. The source housing 50 is secured to one side of the conveyor casing 38 by suitable means. Housing 50 embodies a source of penetrative radiation denoted by the curvilinear lines 54. In a preferred scheme, the radioactive source characteristically emits gamma rays and may be any of the commercially available radioisotopes such as cesium 137. The utilization of electromagnetic radiation insures penetration of the steel conveyor casing 38 as well as the conveyor sidewalls 32 and 34. The detector 52 preferably comprises a Geiger-Mueller tube housed in an elongated cylinder 56. The longitudinal axis of cylinder 56 is positioned horizontally and the cylinder is fastened to the casing 38 at the opposite side of conveyor 30 from the source housing 50. A pair of semi-circular clamps 58 may be used to secure the cylinder 56 to the side of the casing. The source and detector housings are individually mounted at the same height $H_o$ above the level of the grating 36.

The detector 52 receives radiation traversing the lateral dimension of the conveyor 30 and delivers an electrical output signal of a magnitude proportional to the radiation received. The interposition of mass between the source and detector housings reduces the intensity of the radiation 54 in accordance with well known principles. It should be noted that, due to the large lateral dimension of the clicker bed 26, the radiation is attenuated more by changes in clicker height than by the inevitable variations in the wall thickness of the traveling sides 32 and 34. Therefore, substantially all the radiation reaching the G-M tube is determined by the relative height of the clicker bed. The output signal indicative of the clicker bed height is transmitted by the G-M tube over line 60 to a recorder 62 may be of the strip-chart type. In a conventional manner, the output pulses of the G-M tube 52 may be differentiated, shaped and clipped by suitable electronic circuitry located at 62. The resultant square wave pulses may be averaged by an integrating network to develop a D.C. potential $E_o$ indicative of the amount of radiation reaching the G-M tube 52. With suitable calibration, the potential $E_o$ may then be read out on the chart 64 in inches of clinker bed height.

It has been determined that if the clinker bed 26 is maintained at $H_o$, grating burnout is substantially eliminated and a sufficient rate of flow of clinkers of the desired temperature is provided to supply the grinding mills located downstream. Therefore, control of the process is centered about this level to optimize efficiency. A potential $E_t$ indicative of the desired height $H_o$ is generated by a target setter 66 and applied to the input of an error detector 68. Potential $E_o$, representative of the process variations, is also coupled to the input of error detector 68 and compared with the static potential $E_t$. Error detector 68 responds to differences in amplitude of the two input potentials $E_o$ and $E_t$ and produces an error voltage $E_e$ at the output thereof having a polarity and magnitude indicative of the direction and magnitude of the deviation in measured height from the desired height $H_o$. Error voltage $E_e$ is applied to the input of a controller 70 which controls the speed of a motor 72 adapted to drive the cooler conveyor 30.

In the illustrated process, a continuous controller may be used at 70 with excellent results. In accordance with the derived error voltage $E_e$, a servo device is actuated to drive the control shaft of motor 72 in a direction to correct the observed deviation. Tachometer feedback may be provided to afford control of the rate of adjustment per unit of error signal. Inasmuch as a copending application Serial No. 641,414, filed Feb. 20, 1957, by Philip Spergel and Sidney Radley, describes a control system suitable for the illustrated process, reference may be had thereto for a more detailed explanation of a continuous control system. However, the present invention is by no means restricted to a continuous controller and a reset controller of the type shown and described in U.S. Patent No. 2,895,888, issued July 21, 1959 to Donald E. Varner, may be equally suited to accomplish the objects of the present invention.

Referring now to FIG. 2 for a more detailed description of the source-detector geometry, the source housing 50 comprises a block of radiation shielding material such as lead having a centrally located cavity 74 for receiving a source capsule 76. Source capsule 76 is a commercially available item within which is enclosed the radioactive substance. To collimate the radiation issuing from the source capsule 76, a cover 78 having a narrow slot 80 of large horizontal extent is fastened over the cavity 74. When the whole assembly is secured to the side of the casing 38, a concentrated beam is directed in a horizontal plane toward the opposite side of the conveyor 30.

In the same horizontal plane as the source capsule 76, the Geiger-Mueller tube 52 is mounted within the cylinder 56. Since the G-M tube 52 requires a high operating potential, ca., 900 volts, non-conductive spacers are used to insulate it from the cylindrical housing 56. Bolts as at 82 are passed through the clamps 58 to engage the casing wall 38. Although only a single G-M tube is shown in the preferred embodiment it may be desirable to connect several in parallel to increase the signal-to-noise ratio. Additional G-M tubes would be mounted in coplanar relationship with the source capsule 76 and G-M tube 52.

Referring to FIG. 3, the response of the G-M tube 52 is represented by a curve 84. At low levels of the clinker bed, the output $R_1$ of the G-M tube 52 is quite large since the full intensity of the radiation beam impinges upon the detector. However, as the clinker bed level approaches height $H_o$, beam intensity is reduced by the clinkers 26 until the response decreases to $R_2$ at the desired height $H_o$. The response decreases still further as the level of the clinker bed increases. A minimum response $R_3$ is reached where further increases in clinker level are not detectable. Thus, the usefulness of the radiation gauge is limited to measurements in a narrow band about the desired height $H_o$ in the linear region of the response curve 84. On some conveyors having a deep bed, it may be desirable to measure a much wider range of clinker height. Wide band measurement may be provided by mounting the detector 52 vertically and removing the collimating plate 78 from the source housing 50.

However, the resolution of the illustrated apparatus is largely dependent upon the solid angle of radiation subtended by the G-M tube 52. By concentrating the radiation beam in the manner illustrated, the change in detector response is quite large for a small incremental change in clinker height.

The vertical location of the source and detector units with respect to the grating 36 determines the lateral displacement of the curve 84 and thus, the physical center of the useful measurement range. Control about any desired height $H_o$ may be provided by merely re-locating the source and detector units at the desired height above the grating 36 and readjusting the target setter 66.

In the operation of the present invention, changes in the height of the clinker bed 26 are immediately and accurately measured at the head of the cooler conveyor 30. The radiation gauge transmits a signal indicative of the level of the clicker bed over line 60. The recorder 62 produces a continuous permanent record of the clinker level on the chart 64 for operating personnel. If the measured clinker level exceeds $H_o$, controller 70 is energized to increase the speed of motor 72. Conveyor 30 runs at increased speed so that the amount of clinkers 26 deposited on the grating is less. Conversely, in response to an error in the opposite direction, controller 70 directs motor 72 to decrease the speed of conveyor 30. It has been determined in practice that the system of the present invention is operative to continuously maintain the clinker level at the desired height $H_o$ or at least within 1% thereof.

It is obvious that the present invention may also be used to control the level of other conveyed materials in processes where similar problems exist. Accordingly, it must be appreciated that the disclosure submitted herein relates only to one specific embodiment of the present invention wherein the novel results obtained are immediately evident, and that it is well within the skill of one versed in the art to modify the same by addition, deletion or omission of one or more of the component parts without departing from the true spirit and scope of the invention or sacrificing any of its attendant advantages.

I claim:

1. In a cooler conveyor, apparatus for controlling the height of heated material continuously deposited at a more or less uniform rate on said conveyor comprising means for cooling said material deposited on said conveyor, a nuclear source of penetrative radiation, means for mounting said radiation source at one side of said conveyor to direct a beam of radiation into said conveyor at a desired height above the base thereof, a detector for quantitatively detecting radiation, means for mounting said detector at the opposite side of said conveyor to provide an electrical signal of a magnitude indicative of the height of said material, means for generating a second electrical signal proportional to a desired height of said material, means for comparing said first and said second electrical signals to provide an error voltage of a polarity and magnitude in accordance with the direction and magnitude of the deviation in said measured height from said desired value, a variable speed motor for driving said conveyor, and means for adjusting the speed of said motor in accordance with said error voltage to maintain said material at a desired temperature.

2. In a cooler conveyor, apparatus for controlling the height of heated material continuously deposited at a more or less uniform rate on said conveyor, comprising means for cooling said material deposited on said conveyor, a nuclear source of penetrative radiation, means for mounting said radiation source at one side of said conveyor to direct a beam of radiation into said conveyor at a desired height above the base thereof, an elongated detector for quantitatively detecting radiation, means for mounting said detector at the opposite side of said conveyor in said same horizontal plane with the longitudinal axis thereof parallel to said conveyor to generate an electrical voltage of a magnitude proportional to the height of said material between said source and said elongated detector, target setter means for generating a second electrical voltage of a magnitude proportional to a desired height of said material, an error sensing circuit connected to both said first and said second electrical voltages to provide an error voltage of a polarity and magnitude in accordance with the difference therebetween, a variable speed motor for driving said conveyor, and control means responsive to said error voltage for adjusting the speed of said motor whenever said measured material deviates from a desired temperature.

3. The subcombination of claim 2 in which said elongated detector comprises a Geiger-Mueller tube.

References Cited in the file of this patent
UNITED STATES PATENTS

| | | |
|---|---|---|
| 2,031,047 | Lee | Feb. 18, 1936 |
| 2,055,941 | Newhouse | Sept. 29, 1936 |
| 2,737,186 | Molins et al. | Mar. 6, 1956 |
| 2,763,790 | Ohmart | Sept. 18, 1956 |
| 2,800,131 | Molins et al. | July 23, 1957 |